US012720544B2

(12) United States Patent
Ma et al.

(10) Patent No.: US 12,720,544 B2
(45) Date of Patent: Aug. 25, 2026

(54) ENHANCEMENT FOR HARQ-ACK FOR RRC MESSAGE IN EARLY CONTENTION RESOLUTION

(71) Applicant: QUALCOMM Incorporated, San Diego, CA (US)

(72) Inventors: Liangping Ma, San Diego, CA (US); Changhwan Park, San Diego, CA (US); Umesh Phuyal, San Diego, CA (US); Xiao Feng Wang, San Diego, CA (US); Bharat Shrestha, San Diego, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 18/500,870

(22) Filed: Nov. 2, 2023

(65) Prior Publication Data

US 2024/0155609 A1 May 9, 2024

Related U.S. Application Data

(60) Provisional application No. 63/382,449, filed on Nov. 4, 2022.

(51) Int. Cl.

| | |
|---|---|
| ***H04W 72/1273*** | (2023.01) |
| ***H04L 1/1812*** | (2023.01) |
| ***H04W 72/21*** | (2023.01) |
| ***H04W 72/232*** | (2023.01) |
| ***H04W 76/20*** | (2018.01) |

(52) U.S. Cl.
CPC ....... *H04W 72/1273* (2013.01); *H04L 1/1812* (2013.01); *H04W 72/21* (2023.01); *H04W 72/232* (2023.01); *H04W 76/20* (2018.02)

(58) Field of Classification Search
None
See application file for complete search history.

(56) References Cited

U.S. PATENT DOCUMENTS

| | | | | |
|---|---|---|---|---|
| 11,503,609 | B2 * | 11/2022 | Yang | H04W 72/0446 |
| 12,207,271 | B2 * | 1/2025 | Taherzadeh Boroujeni | H04W 74/006 |
| 2018/0070282 | A1 * | 3/2018 | Su | H04W 72/12 |

(Continued)

*Primary Examiner* — Lonnie V Sweet
(74) *Attorney, Agent, or Firm* — ArentFox Schiff, LLP

(57) ABSTRACT

Aspects are provided for repeating a configuration for a transmission after contention resolution in an early contention resolution. An apparatus may be configured to obtain a configuration indicating a number of repetitions for a PUCCH transmission for a PDSCH prior to activation of a dedicated PUCCH resource configuration. The PUCCH transmission may include a HARQ feedback message after receiving a contention resolution message carried in a prior PDSCH in a random access procedure. The apparatus may also be configured to transmit the HARQ feedback message for the PDSCH on a PUCCH according to the number of repetitions. The apparatus may further be configured to transmit a subsequent HARQ feedback message for the PDSCH on the PUCCH according to the number of repetitions for the HARQ feedback message for the PDSCH on the PUCCH. This allows coverage techniques to be applied to certain transmissions in order to improve coverage and reliability.

27 Claims, 13 Drawing Sheets

(56) References Cited

U.S. PATENT DOCUMENTS

| | | | | |
|---|---|---|---|---|
| 2019/0182824 | A1* | 6/2019 | Chatterjee | H04L 5/0053 |
| 2021/0352735 | A1* | 11/2021 | Bae | H04W 74/0841 |
| 2022/0312475 | A1* | 9/2022 | He | H04W 74/006 |
| 2024/0049292 | A1* | 2/2024 | Liu | H04L 1/1893 |
| 2024/0147523 | A1* | 5/2024 | Maso | H04W 74/0833 |
| 2024/0204925 | A1* | 6/2024 | Ye | H04L 1/1887 |
| 2024/0305413 | A1* | 9/2024 | Al-Imari | H04W 72/1268 |
| 2024/0306155 | A1* | 9/2024 | Liu | H04L 5/0053 |
| 2025/0133566 | A1* | 4/2025 | Liu | H04B 1/713 |
| 2025/0300758 | A1* | 9/2025 | Echigo | H04L 27/2607 |

* cited by examiner

Service Management and Orchestration (SMO) Framework
Non-Real Time RAN Intelligent Controller (RIC)
105
115
190
Core Network
Backhaul link
O1
A1
Near-Real Time RAN Intelligent Controller (RIC)
125
E2
O-eNB
111
O2
O-Cloud
189
CU
183
F1
Midhaul link
DU
185
E2
Fronthaul link
RU
187
UE
104
Access link

ENHANCEMENT FOR HARQ-ACK FOR RRC MESSAGE IN EARLY CONTENTION RESOLUTION

CROSS REFERENCE TO RELATED APPLICATION(S)

This application claims the benefit of U.S. Provisional Application Ser. No. 63/382,449, entitled "ENHANCEMENT FOR HARQ-ACK FOR RRC MESSAGE IN EARLY CONTENTION RESOLUTION" and filed on Nov. 4, 2022, which is expressly incorporated by reference herein in its entirety.

TECHNICAL FIELD

This disclosure relates generally to wireless communication, and more specifically, to techniques for repeating a configuration for a transmission after contention resolution (Message 4) in an early contention resolution.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The systems, methods, and devices of this disclosure each have several innovative aspects, no single one of which is solely responsible for the desirable attributes disclosed herein.

One innovative aspect of the subject matter described in this disclosure can be implemented in an apparatus for wireless communication. The apparatus includes a memory and a processor coupled to the memory. The processor is configured to obtain a configuration indicating a number of repetitions for a physical uplink control channel (PUCCH) transmission for a Physical Downlink Shared Channel (PDSCH) prior to activation of a dedicated PUCCH resource configuration. The PUCCH transmission may include a Hybrid Automatic Repeat Request (HARQ) feedback message after receiving a contention resolution message carried in a prior PDSCH in a random access procedure. The processor is further configured transmit the HARQ feedback message for the PDSCH on a PUCCH according to the number of repetitions.

A further aspect of the subject matter described in this disclosure can be implemented in an apparatus for wireless communication. The apparatus includes a memory and at least one processor coupled to the memory. The processor is also configured to transmit a contention resolution message on a PDSCH channel in a random access procedure. The processor is also configured to transmit a configuration indicating a number of repetitions for a scheduled PUCCH transmission for a PDSCH prior to activation of a dedicated PUCCH resource configuration. The scheduled PUCCH transmission may include a HARQ feedback message after transmitting a contention resolution message carried in a prior PDSCH in a random access procedure. The processor is further configured to obtain a number of repetitions for the HARQ feedback message for the PDSCH on a PUCCH.

Another further aspect of the subject matter described in this disclosure can be implemented in a method of wireless communication at a UE. The method includes obtaining a configuration indicating a number of repetitions for a PUCCH transmission for a PDSCH prior to activation of a dedicated PUCCH resource configuration. The PUCCH transmission may include a HARQ feedback message after receiving a contention resolution message carried in a prior PDSCH in a random access procedure. The method further includes transmitting the HARQ feedback message for the PDSCH on a PUCCH according to the number of repetitions.

Another further aspect of the subject matter described in this disclosure can be implemented in a method of wireless communication at a base station. The method includes transmitting a contention resolution message on a PDSCH channel in a random access procedure. The method also includes transmitting a configuration indicating a number of repetitions for a scheduled PUCCH transmission for a PDSCH prior to activation of a dedicated PUCCH resource configuration. The scheduled PUCCH transmission may include a HARQ feedback message after transmitting a contention resolution message carried in a prior PDSCH in a random access procedure. The method further includes obtaining a repetition for the HARQ feedback message for the PDSCH on a PUCCH.

Another further aspect of the subject can be implemented in an apparatus for wireless communication. The apparatus includes means for obtaining a configuration indicating a number of repetitions for a PUCCH transmission for a PDSCH prior to activation of a dedicated PUCCH resource configuration. The PUCCH transmission may include a HARQ feedback message after receiving a contention resolution message carried in a prior PDSCH in a random access procedure. The apparatus further includes means for transmitting the HARQ feedback message for the PDSCH on a PUCCH according to the number of repetitions.

Another further aspect of the subject can be implemented in an apparatus for wireless communication. The apparatus includes means for transmitting a contention resolution message on a PDSCH channel in a random access procedure. The apparatus also includes means for transmitting a configuration indicating a number of repetitions for a scheduled PUCCH transmission for a PDSCH prior to activation of a dedicated PUCCH resource configuration. The scheduled PUCCH transmission may include a HARQ feedback message after transmitting a contention resolution message carried in a prior PDSCH in a random access procedure. The apparatus further includes means for obtaining a repetition for the HARQ feedback message for the PDSCH on a PUCCH.

Another further aspect of the subject matter described in this disclosure can be implemented in a non-transitory computer-readable medium storing computer-executable code including stored instructions of communications, executable by a processor to: obtain a configuration indicating a number of repetitions for a PUCCH transmission for a PDSCH prior to activation of a dedicated PUCCH resource configuration, wherein the PUCCH transmission includes a HARQ feedback message after receiving a contention resolution message carried in a prior PDSCH in a random access procedure; and transmit the HARQ feedback message for the PDSCH on a PUCCH according to the number of repetitions.

Another further aspect of the subject matter described in this disclosure can be implemented in a non-transitory computer-readable medium storing computer-executable code, the code when executed by a processor cause the processor to: transmit a contention resolution message on a PDSCH channel in a random access procedure; transmit a configuration indicating a number of repetitions for a scheduled PUCCH transmission for a PDSCH prior to activation of a dedicated PUCCH resource configuration, wherein the scheduled PUCCH transmission includes a HARQ feedback message after transmitting a contention resolution message carried in a prior PDSCH in a random access procedure; and obtain a repetition for the HARQ feedback message for the PDSCH on a PUCCH.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
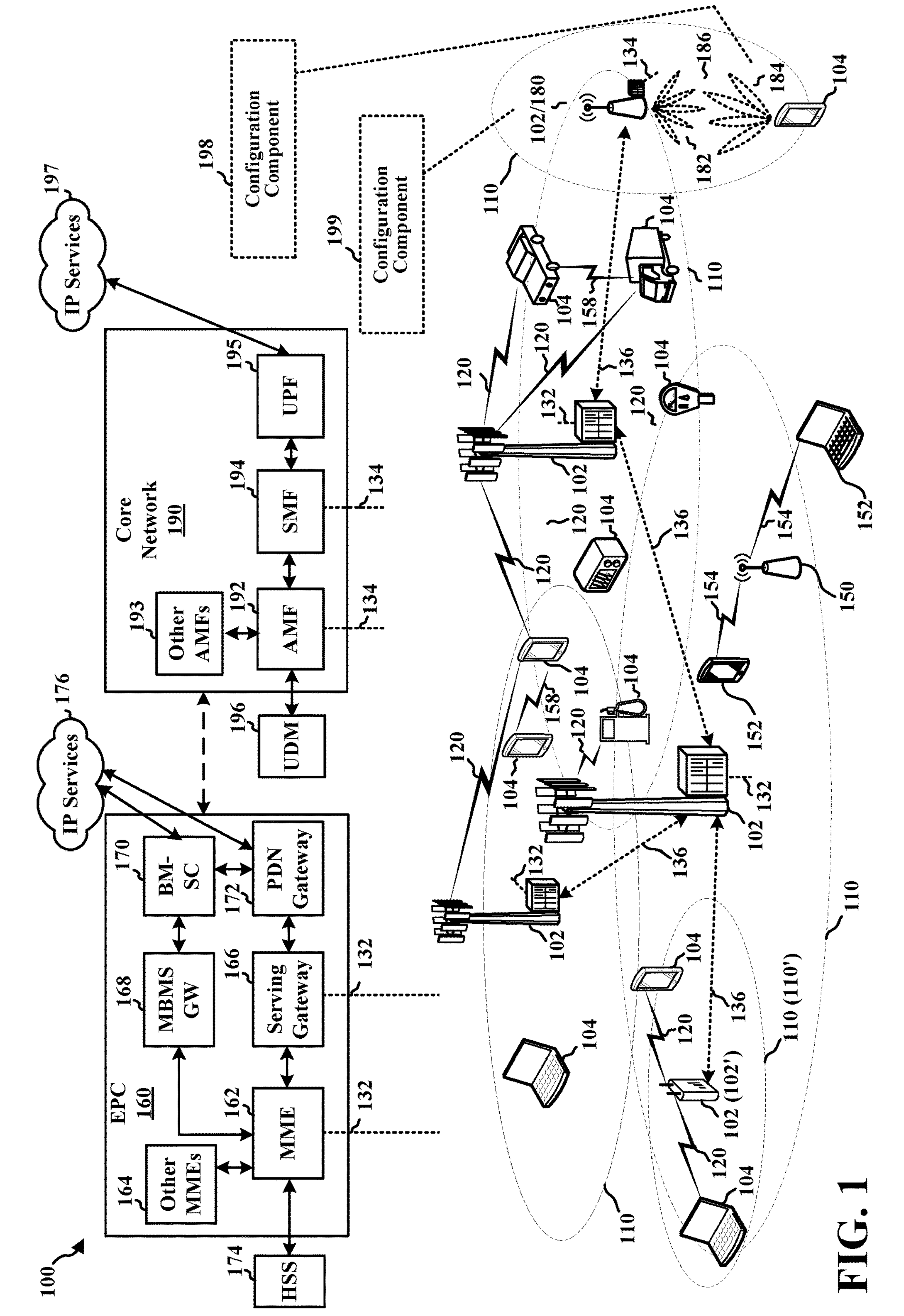
FIG. 1 is a diagram illustrating an example of a wireless communications system and an access network.

The following description is directed to some particular aspects for the purposes of describing innovative aspects of this disclosure. However, a person having ordinary skill in the art will readily recognize that the teachings herein can be applied in a multitude of different ways. The described aspects can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described aspects can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described aspects also can be implemented using other wireless communication protocols or RF signals suitable for use in one or more of a wireless personal area network (WPAN), a wireless local area network (WLAN), a wireless wide area network (WWAN), or an internet of things (IOT) network.

In non-terrestrial networks (NTN), there is a large distance between user equipment (UE) and receiver (e.g., satellite or base station) in satellite-based communication due to Hybrid Automatic Repeat Request (HARQ) Acknowledgement (ACK) being sent in uplink on a Physical Uplink Control Channel (PUCCH). Accordingly, HARQ-ACK may fail with a high probability due to the large distance without coverage enhancement such as repetition. Currently, for PUCCH before dedicated PUCCH resource configuration, there is no repetition associated with the PUCCH resource set or mechanisms to enhance the robustness of the message.

PUCCH repetitions may be supported when the PUCCH transmission is scheduled using dedicated PUCCH resources. PUCCH repetitions may not be supported when the PUCCH transmission is scheduled via a PUCCH resource set that is provided via system information (e.g., system information block 1 (SIB1)), as is the case for the HARQ-ACK transmission on PUCCH in response to Message 4 (i.e., PUCCH transmission during random access procedures). However, Message 4 HARQ-ACK is sent in a PUCCH transmission before the dedicated PUCCH resource configuration and there is no repetition associated with the PUCCH resources set. Thus, it would be helpful if the performance of PUCCH carrying the HARQ-ACK bit for Message 4 could be enhanced in coverage limited scenarios.

In order to improve coverage and reliability, coverage enhancement techniques may be applied to certain transmissions, such as a PUCCH transmission. Specifically, the coverage enhancement technique may include a repetition of a transmission for coverage extension for a second PUCCH transmission for radio resource control (RRC) message HARQ-ACK with repetition. In early contention resolution, the second PDSCH (e.g., the first PDSCH is Message 4 itself) that carries the RRC message (e.g., RRCSetup, RRCReconfiguration) is scheduled by a PDCCH carrying DCI 1_0 scrambled by Cell Radio Network Temporary Identifier (C-RNTI). DCI 1_0 scrambled by C-RNTI is a particular DCI format that is used to schedule Contention Resolution (Message 4) in Random Access Channel (RACH) procedure. For instance, there are reserved bits (e.g., the two downlink assignment index (DAI) bits) in DCI 1_0 scrambled by TC-RNTI. The reserved bits may be used to indicate PUCCH repetition for HARQ-ACK for Message 4. However, there are no reserved bits in DCI 1_0 scrambled by C-RNTI. DCI 1_0 scrambled by C-RNTI. C-RNTI is used for the scheduling of PDSCH in one cell. This means that the reserved bits approach will not work for DCI 1_0 scrambled by C-RNTI.

As described in further detail in the present disclosure, PUCCH repetition may be performed to increase coverage extension during random access procedures. In particular, a UE may perform repetition on a PUCCH transmission that contains a HARQ feedback message for a PDSCH. The PUCCH transmission may then be transmitted on resources prior to activation of dedicated PUCCH resource configuration.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells, such as high power cellular base stations, and/or small cells, such as low power cellular base stations (including femtocells, picocells, and microcells).

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as the Next Generation Radio Access Network (RAN) (NG-RAN), may interface with a core network 190 through second backhaul links 134. In addition to other functions, the base stations 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In an aspect, the base stations 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture including multiple units, some or all of which may be collocated or distributed and which may communicate with one another. For example, FIG. 2, infra, illustrates an example disaggregated base station 181 architecture that includes at least one of a central unit (CU) 183, a distributed unit (DU) 185, a radio unit (RU) 187, a remote radio head (RRH), a remote unit, and/or another similar unit configured to implement one or more layers of a radio protocol stack.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cells and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link)

transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances, in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

In view of the foregoing, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102 may be implemented as a macro base station providing a large cell or may be implemented as a small cell 102' having a small cell coverage area. Some base stations 102 may operate in a traditional sub-6 GHz (or sub-7 GHz) spectrum, in mmW frequencies, and/or near-mmW frequencies in communication with the UE 104. When such a base station operates in mmW or near-mmW frequencies, the base station may be referred to as a mmW base station 180. The mmW base station 180 may utilize beamforming 186 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182. The UE 104 may receive the beamformed signal from the base station 180 in one or more receive directions 184. The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

In an aspect, the UE 104 may include a configuration component 198 that is configured to obtain a configuration indicating a number of repetitions for a PUCCH transmission prior to activation of a dedicated PUCCH resource configuration. The PUCCH transmission may include a HARQ feedback message after receiving a contention resolution message carried in a prior PDSCH in a random access procedure. The configuration component 198 may also be configured to transmit the HARQ feedback message for the PDSCH on a PUCCH according to the number of repetitions.

In an aspect, the base station 102/180 (e.g., network entity or a network node, such as a gNB) may include a configuration component 199 that is configured to transmit a contention resolution message on a PDSCH channel in a random access procedure. The configuration component 199 may further be configured to transmit a configuration indicating a number of repetitions for a scheduled PUCCH transmission for a PDSCH prior to activation of a dedicated PUCCH resource configuration. The scheduled PUCCH transmission may include a HARQ feedback message after transmitting a contention resolution message carried in a prior PDSCH in a random access procedure. The configuration component 199 may be configured to obtain a number of repetitions for the HARQ feedback message for the PDSCH on a PUCCH.

Figure 2:
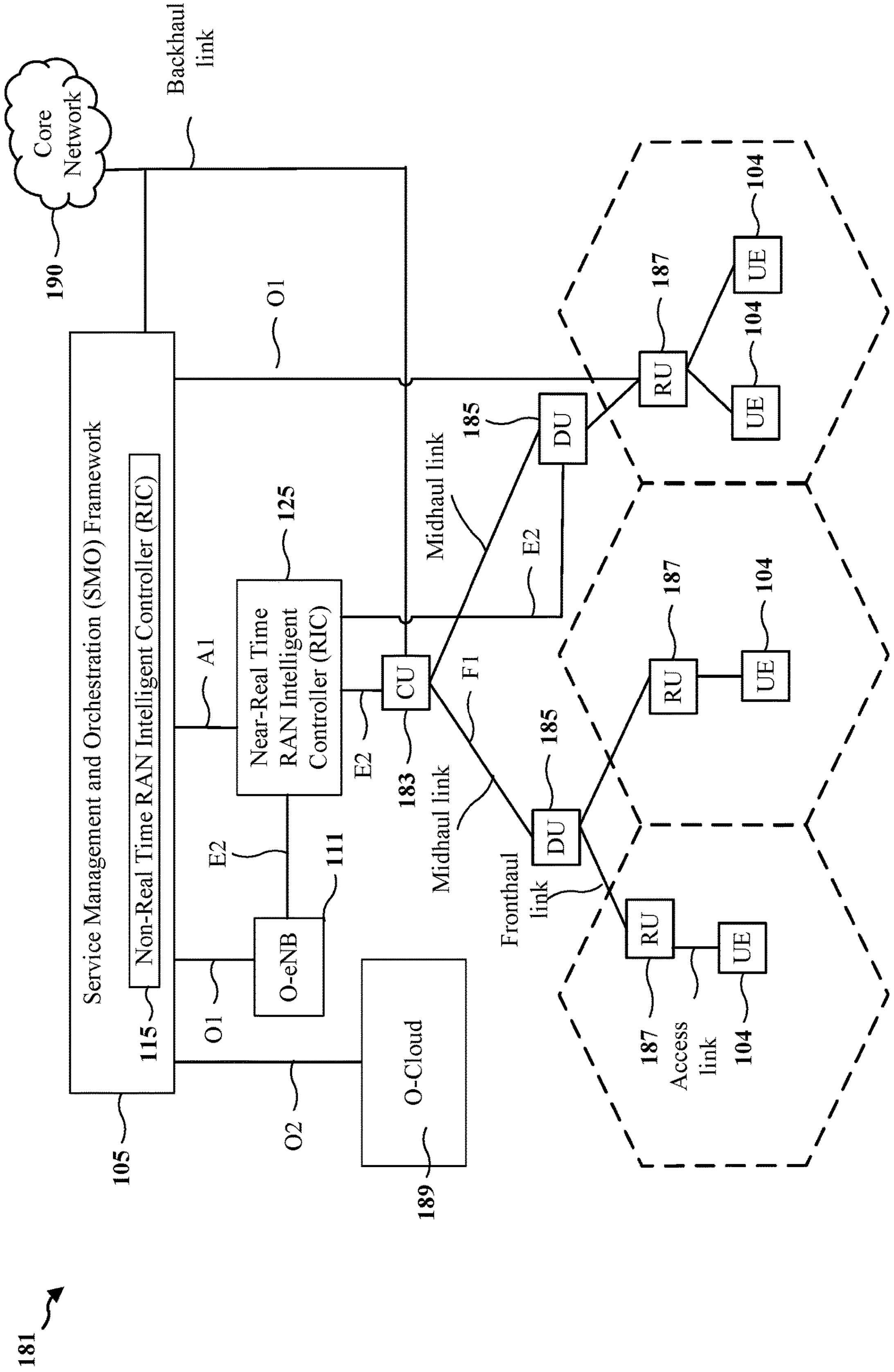
FIG. 2 is a diagram illustrating an example disaggregated base station architecture.

FIG. 2 shows a diagram illustrating an example disaggregated base station 181 architecture. The disaggregated base station 181 architecture may include one or more CUs 183 that can communicate directly with core network 190 via a backhaul link, or indirectly with the core network 190 through one or more disaggregated base station units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUs 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more base station functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

Figures 3A, 3B, 3C, 3D:
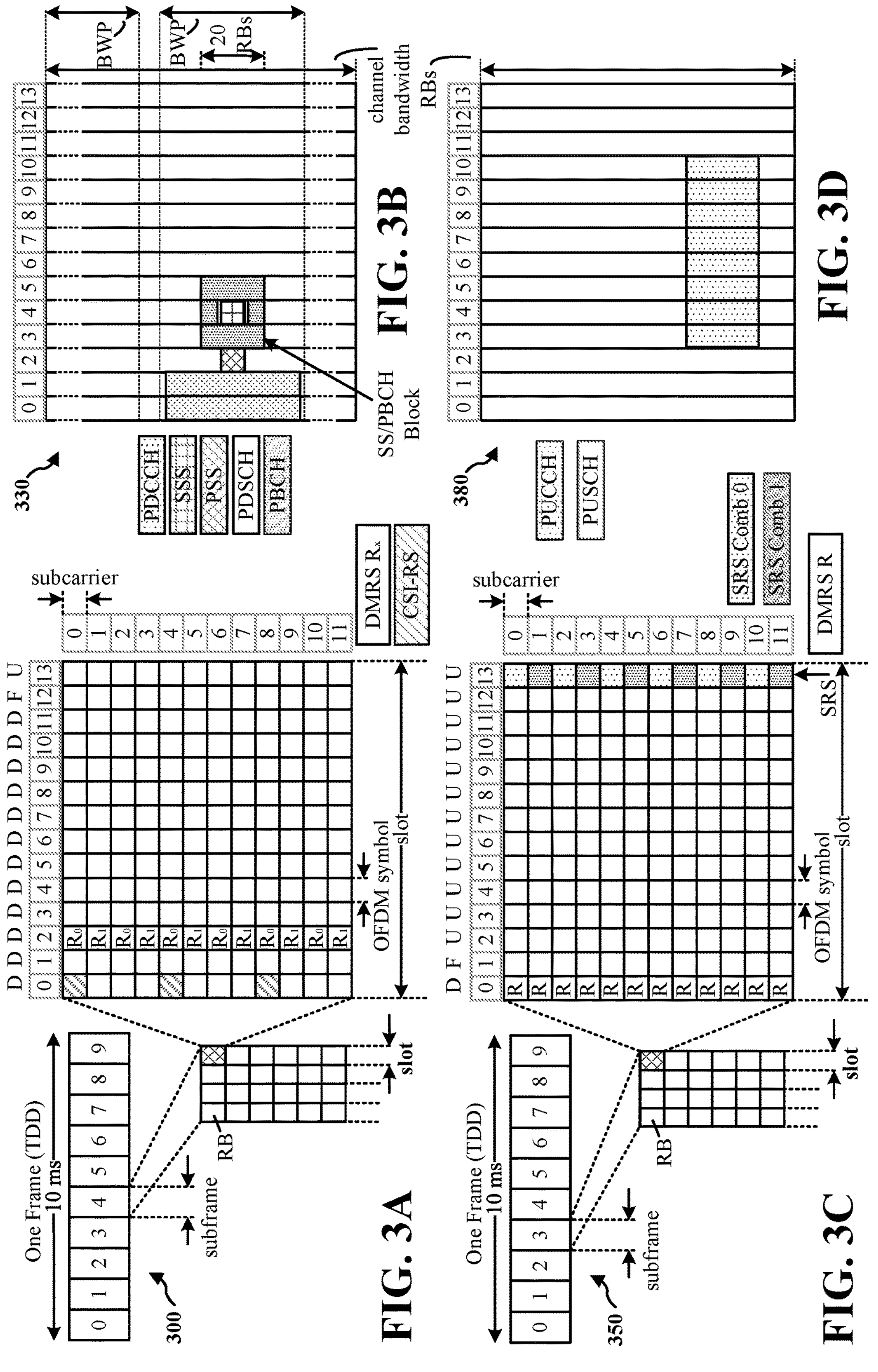
FIG. 3A is a diagram illustrating an example of a first frame, in accordance with various aspects of the present disclosure.
FIG. 3B is a diagram illustrating an example of downlink channels within a subframe, in accordance with various aspects of the present disclosure.
FIG. 3C is a diagram illustrating an example of a second frame, in accordance with various aspects of the present disclosure.
FIG. 3D is a diagram illustrating an example of uplink channels within a subframe, in accordance with various aspects of the present disclosure.

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A and 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink).

While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 3B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as Rx for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1) may use the PSS to determine subframe/symbol timing and a physical layer identity. A secondary synchronization signal (SSS) may be within symbol 4 of particular subframes of a frame. A UE (such as a UE 104 of FIG. 1) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 4:
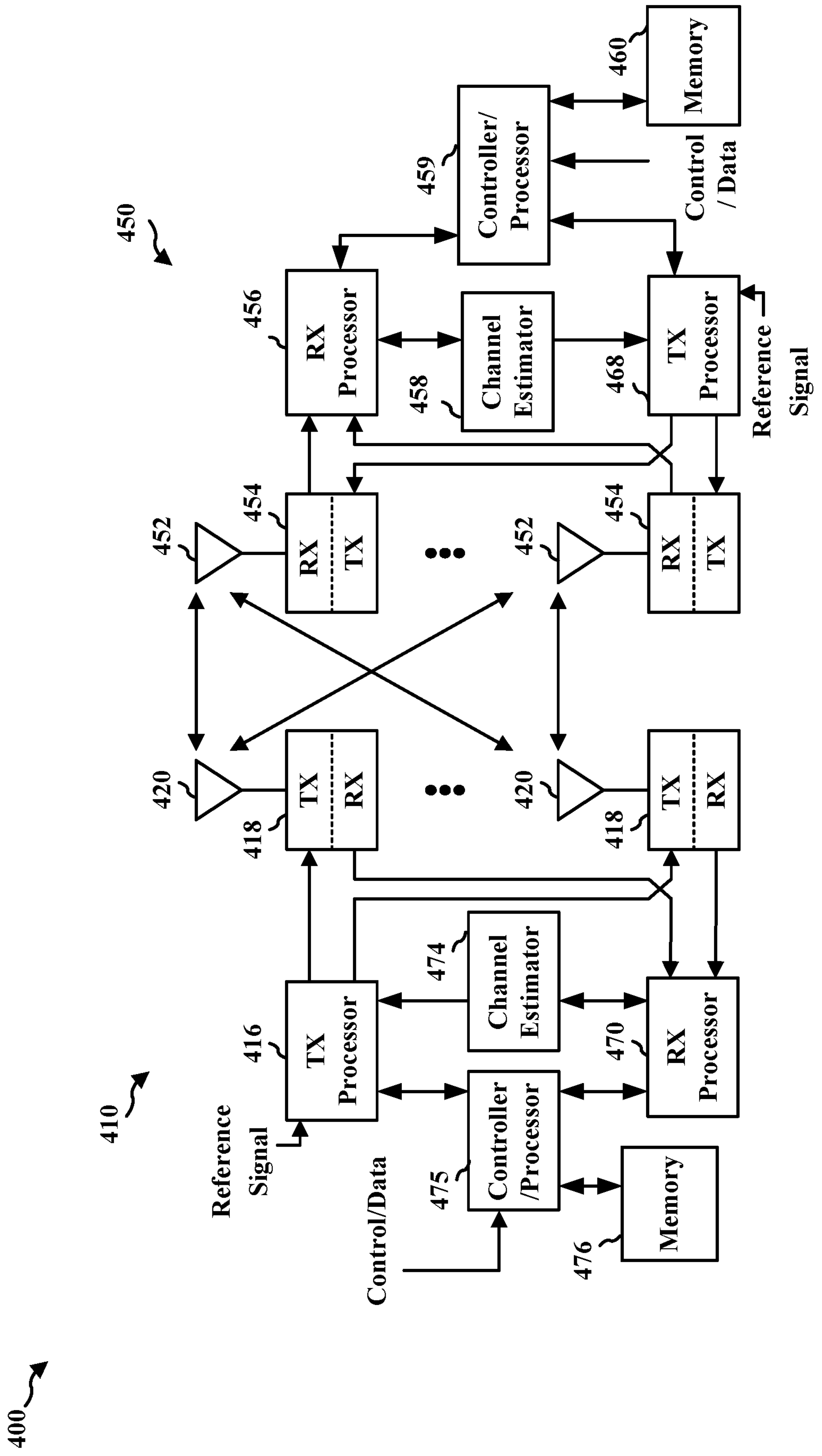
FIG. 4 is a diagram illustrating an example of a base station and user equipment (UE) in an access network.

FIG. 4 is a block diagram of a base station 410 in communication with a UE 450 in an access network 400. In the downlink, IP packets from the EPC 160 may be provided to a controller/processor 475. The controller/processor 475 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 475 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

At the UE 450, each receiver 454RX receives a signal through at least one respective antenna 452. Each receiver 454RX recovers information modulated onto an RF carrier and provides the information to the receive (RX) processor 456. The TX processor 468 and the RX processor 456 implement L1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements L3 and L2 functionality.

The controller/processor 459 can be associated with a memory 460 that stores program codes and data. The memory 460 may be referred to as a computer-readable medium. In the uplink, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the downlink transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the base station 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with the configuration component 198 of FIG. 1.

At least one of the TX processor 416, the RX processor 470, and the controller/processor 475 may be configured to perform aspects in connection with the configuration component 199 of FIG. 1.

Figure 5:
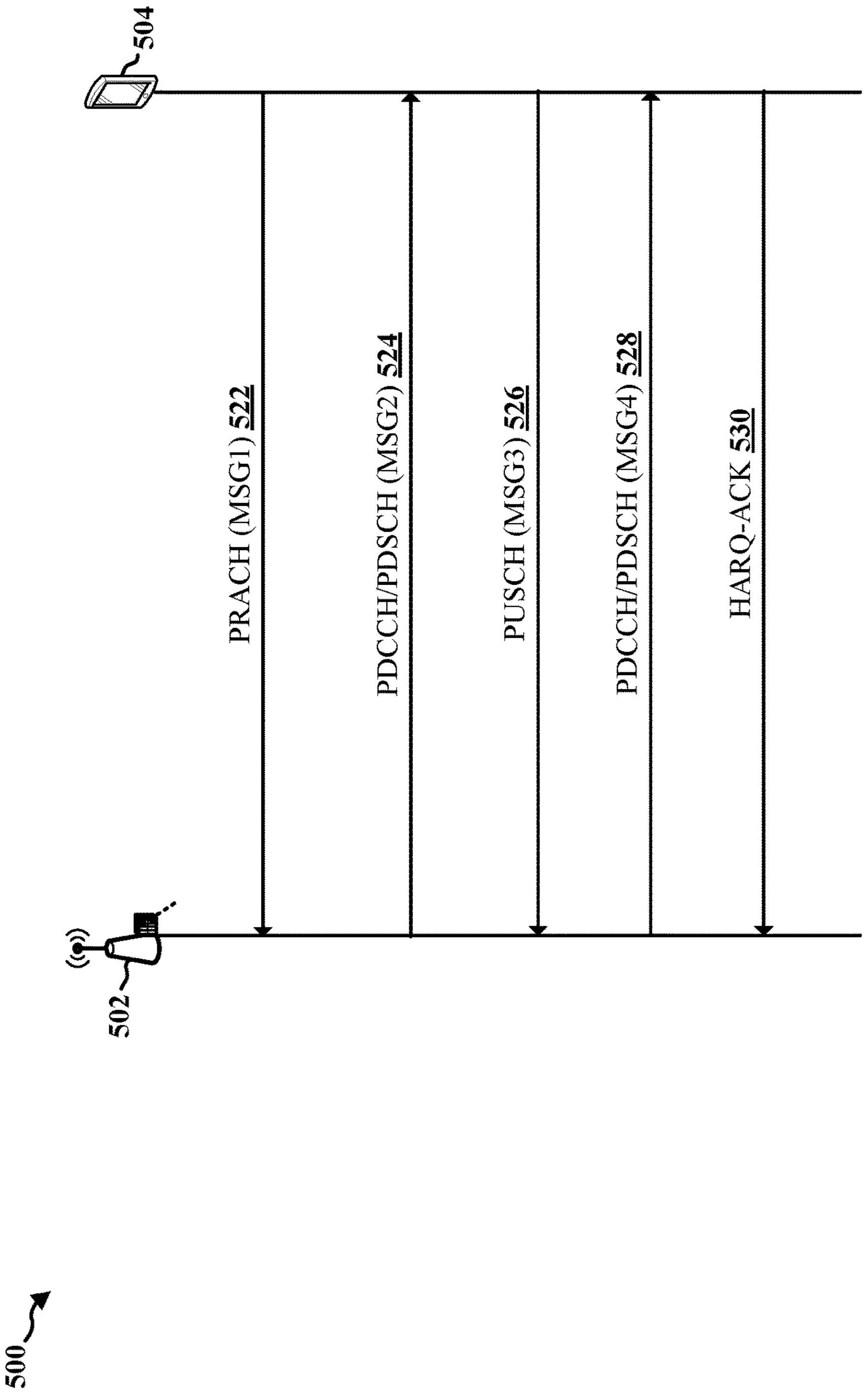
FIGS. 5 through 7 illustrate examples of call flow diagrams between a base station and a UE.

FIG. 5 illustrates an example of a wireless communication system 500 that supports a four-step random access channel (RACH) procedure in accordance with various aspects of the present disclosure. In some examples, wireless communication system 500 may implement aspects of access network 100. For example, wireless communication system 500 includes UE 504 and base station 502, which may be examples of the corresponding devices described with reference to FIG. 1. Wireless communication system 500 may support random access procedures for UEs 504 that initiate access to a base station 502.

As seen in FIG. 5, a typical RACH procedure may involve four transmissions. First, a UE 504 may transmit Message 1 on the physical random access channel (PRACH) at 522. The Message 1 transmission is a first transmission that may include a PRACH preamble, including timing information for uplink transmissions that allow the base station 502 to set timing advance parameters, for example. In response to receiving Message 1, the base station 502 may transmit a Message 2 transmission on the PDCCH or PDSCH at 524. The Message 2 transmission may also be referred to as a random access response (RAR) message, and the contents may include timing advance parameters or information, an uplink grant for the UE's 504 Message 3 transmission on the uplink, a temporary cell radio network temporary identifier (TC-RNTI), and the like. In some instances, the TC-RNTI may be sent to the UE 504 to indicate the scrambling sequence used for Message 4 transmission.

After receiving Message 2 or the RAR, the UE 504 may then transmit Message 3 on PUSCH at 526 using resources scheduled by the uplink grant of Message 2. In some instances, the contents of Message 3 may include an RRC connection request, a scheduling request, a buffer status of the UE 504, or the like. The base station 502 may then transmit a contention resolution message referred to as Message 4 on the PDCCH or PDSCH at 528. The UE 504 then sends a HARQ-ACK message at 530 to acknowledge that Message 4 was received at the UE 504 and the UE contention resolution identity in Message 4 matched the identity transmitted in Message 3. The RACH procedure depicted in FIG. 5 may be performed in various use cases, including for initial access to a network or cell, when a UE 504 transitions from an RRC Idle/Inactive state to an RRC Connected state (e.g., after receiving a paging message), or when a UE 504 is changing serving base stations 502 during a handover procedure. Further, in some instances, a UE 504 may use the RACH procedure described above to send small uplink data transmissions during RRC Idle/Inactive states in order to save on the overhead costs of leaving RRC Idle/Inactive states into RRC Connected state just to transmit a relatively small amount of data.

Figure 6:
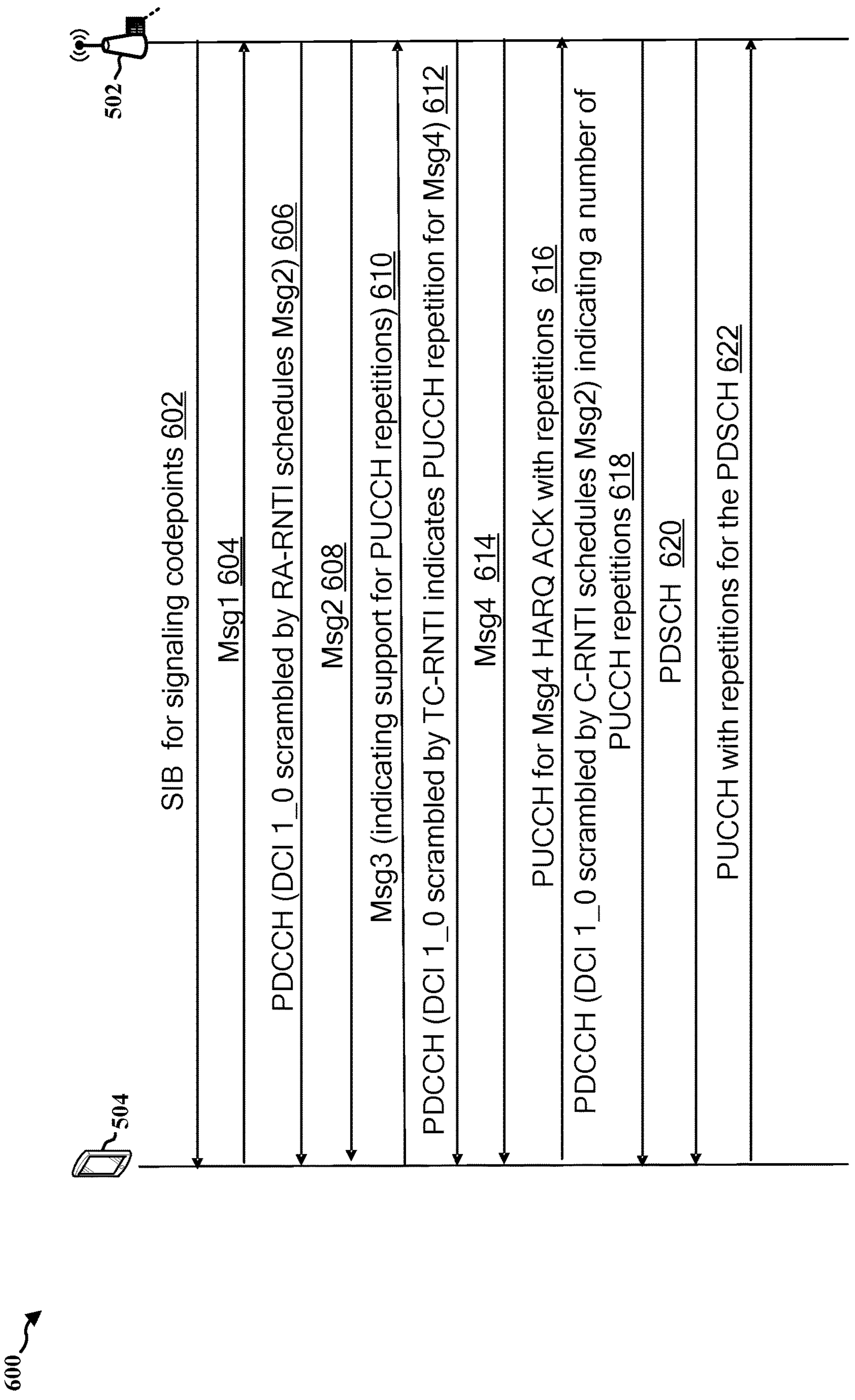

FIG. 6 is a call flow 600 diagram between a UE 504 and a base station 502. A call flow 600 illustrates an exemplary sequence of operations performed between the UE 504 and the base station 502 to indicate PUCCH repetition for PDSCH in an early contention resolution case. For example, call flow 600 depicts operations for applying PUCCH repetition for a second PDSCH (e.g., the first PDSCH is Message 4) prior to configuration of dedicated PUCCH resources by adding repetition indication. It is understood that one or more of the operations described in call flow 600 may be performed earlier or later in the process, omitted, replaced, supplemented, or combined with another operation. Also, additional operations described herein that are not included in call flow 600 may be included in call flow 600.

The UE 504 may correspond to UE 104, 450, and apparatus 1202. The base station 502 may correspond to base station 102/180, 410, and apparatus 1302.

At 602, the base station 502 transmits a SIB signaling codepoints to indicate a repetition number to the UE 504. As a non-limiting example, the codepoints may include mappings such as bits 00 mapping to 1 repetition, bits 01 mapping to 4 repetitions, bits 10 mapping to 8 repetitions, and bits 11 mapping to 16 repetitions.

At 604, the UE 504 transmits a Message 1 to the base station 502. For example, referring back to 522 from FIG. 5, the UE 504 transmits a Message 1 transmission on PRACH to the base station 502.

At 606, the base station 502 transmits a PDCCH carrying a DCI 1_0 scrambled by Random Access radio network temporary identifier (RA-RNTI) scheduling Message 2 to the UE 504. The RNTI is used to identify one specific radio channel from other radio channel and one user from another user. In other words, the RNTI is a kind of UE ID for the traffic between UE and eNB lower layer. Specifically, the UE 504 determines RA-RNTI and RA-RNTI is used for PRACH response.

At 608, the base station 502 transmits a Message 2 to the UE 504. For example, referring back to 524 from FIG. 5, the base station 502 transmits a Message 2 transmission on the PDCCH or PDSCH to the UE 504.

At 610, the UE 504 transmits a Message 3 indicating support for PUCCH repetitions to the base station 502. For example, referring back to 526 from FIG. 5, the UE 504 transmits a Message 3 transmission on the PUSCH using resources scheduled by the uplink grant of Message 2 to the base station 502.

At 612, the base station 502 transmits a PDCCH carrying a DCI 1_0 scrambled by Temporary Cell RNTI (TC-RNTI) indicating a PUCCH repetition or Message 4 the UE 504. The TC-RNTI is also used during Random Access procedure. Specifically, the TC-RNTI is used for further communication between UE 504 and the base station 502. During contention based random access procedure, the UE 504 stores received TC-RNTI (e.g., received in RAR) and uses it during random access procedure. The UE 504 discards the TC-RNTI value received in RAR during non-contention based random access procedure. The UE 504 is configured to use TC-RNTI for scrambling of Message 3 (PUSCH corresponding to RAR grant) and its retransmissions.

At 614, the base station 502 transmits a Message 4 to the UE 504. For example, referring back to 528 from FIG. 5, the base station 502 may then transmit a contention resolution message referred to as Message 4 on the PDCCH or PDSCH to the UE 504.

At 616, the UE 504 transmits a PUCCH for Message 4 HARQ-ACK with repetitions to the base station 502. For example, referring back to 530 from FIG. 5, the UE 504 then transmits a HARQ-ACK message to acknowledge that Message 4 was received at the UE 504 and the UE contention resolution identity in Message 4 matched the identity transmitted in Message 3.

At 618, the base station 502 transmits a PDCCH carrying a DCI 1_0 scrambled by Cell RNTI (C-RNTI) scheduling Message 2 to the UE 504. The C-RNTI is a unique identification used for identifying RRC Connection and scheduling which is dedicated to a particular UE. The gNB assigns different C-RNTI values to different UEs. The gNB uses C-RNTI to allocate a UE with uplink grants, downlink assignments, etc. C-RNTI may be used by gNB to differentiate uplink transmission (e.g., PUSCH, PUCCH) of a UE from others. Here, the network may indicate the number of PUCCH repetitions in the DCI 1_0 scrambled by C-RNTI which schedules the first RRC message (e.g., RRCSetup, RRCReconfiguration) after the contention resolution message (e.g., Message 4). In some aspects, the mapping for dynamic indication by the scheduling DCI may repurpose some bits. In some aspects, the mapping for dynamic indication by the scheduling DCI may add new bits. In some aspects, the mapping for dynamic indication by the scheduling DCI may have some reserved bits. In some aspects, the bits may be interpreted literally, according to a mapping (e.g., in a table) in a technical specification (e.g., the mappings of the bit value is written in a technical specification), or mapped based on codepoints signaled in a SIB, which means the network may signal the codepoints in step 602.

At 620, the base station 502 transmits a PDSCH to the UE 504. In some aspects, the PDSCH carries a RRC message (e.g., RRCSetup, RRCReconfiguration).

At 622, the UE 504 transmits a PUCCH for the PDSCH. The PUCCH has repetitions and carries a HARQ feedback message. The HARQ feedback message carries at least a HARQ ACK bit, the value of which is an ACK or NACK.

It should be understood that the specific messages and the number of repetitions used in call flow 600 diagram is non-limiting should be illustrative only.

Figure 7:
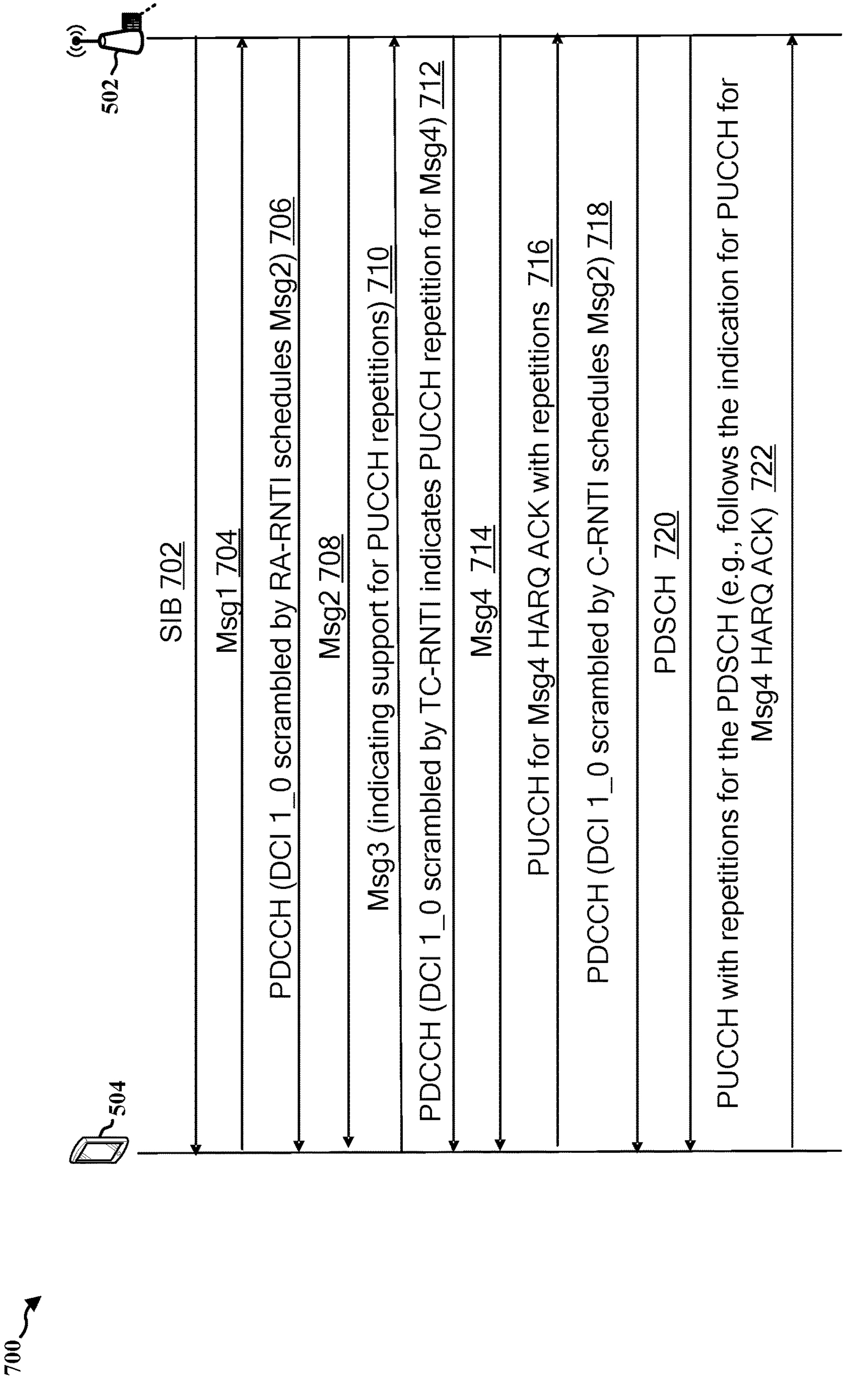

FIG. 7 is a call flow 700 diagram between a UE 504 and a base station 502. A call flow 600 illustrates an exemplary sequence of operations performed between the UE 504 and the base station 502 to indicate PUCCH repetition for PDSCH in an early contention resolution case. For example, call flow 700 depicts operations for applying PUCCH repetition for a second PDSCH (e.g., the first PDSCH is Message 4) prior to configuration of dedicated PUCCH resources by following an indication for PUCCH for Message 4 HARQ-ACK. It is understood that one or more of the operations described in call flow 700 may be performed earlier or later in the process, omitted, replaced, supplemented, or combined with another operation. Also, additional operations described herein that are not included in call flow 700 may be included in call flow 700.

The UE 504 may correspond to UE 104, 450, and apparatus 1202. The base station 502 may correspond to base station 102/180, 410, and apparatus 1302.

At 702, the base station 502 transmits a SIB to the UE 504.

At 704, the UE 504 transmits a Message 1 to the base station 502.

At 706, the base station 502 transmits a PDCCH carrying a DCI 1_0 scrambled by Random Access radio network temporary identifier (RA-RNTI) scheduling Message 2 to the UE 504. The RNTI is used to identify one specific radio channel from other radio channel and one user from another user. In other words, the RNTI is a kind of UE ID for the traffic between UE and eNB lower layer. Specifically, the UE 504 determines RA-RNTI and RA-RNTI is used for PRACH response.

At 708, the base station 502 transmits a Message 2 to the UE 504.

At 710, the UE 504 transmits a Message 3 indicating support for PUCCH repetitions to the base station 502.

At 712, the base station 502 transmits a PDCCH carrying a DCI 1_0 scrambled by Temporary Cell RNTI (TC-RNTI) indicating a PUCCH repetition or MESSAGE 4 the UE 504.

At 714, the base station 502 transmits a Message 4 to the UE 504.

At 716, the UE 504 transmits a PUCCH for Message 4 HARQ-ACK with repetitions to the base station 502.

At 718, the base station 502 transmits a PDCCH carrying a DCI 1_0 scrambled by Cell RNTI (C-RNTI) scheduling Message 2 to the UE 504.

At 720, the base station 502 transmits a PDSCH to the UE 504. In some aspects, the PDSCH carries a RRC message (e.g., RRCSetup, RRCReconfiguration).

At 722, the UE 504 transmits a PUCCH with repetitions for the PDSCH. In some aspects, the PDSCH carries a RRC message (e.g., RRCSetup, RRCReconfiguration) after Message 4. The number of repetitions follows the indication for PUCCH repetition for Message 4 HARQ-ACK from step 716. In some aspects, the indication may be via reserved bits (e.g., the two DAI bits) in DCI 1_0 scrambled by TC-RNTI from step 612. In some aspects, the indication may be via CSI request bit in the RAR UL grant. In an aspect, a CSI request bit from a RAR grant is based on an indication of one of two PUCCH repetition values that the base station 502 supports. As a non-limiting example, there may be no repetition when the bit is 0 and there may be 4 repetitions when the bit is 1. In some aspects, the bits may also be mapped to codepoints according to a mapping signaled in a SIB, or according to a mapping (e.g., a table) in a technical specification.

In some aspects, the UE 504 may expect the network to use the same repetition configuration between the first Message 4 transmission and the Message 4 retransmission. This avoids ambiguity which could occur if the UE 504 decodes the first Message 4 transmission, but the HARQ-ACK fails and stop monitoring PDCCH while the network schedules a Message 4 retransmission with a different repetition indication.

Figure 8:
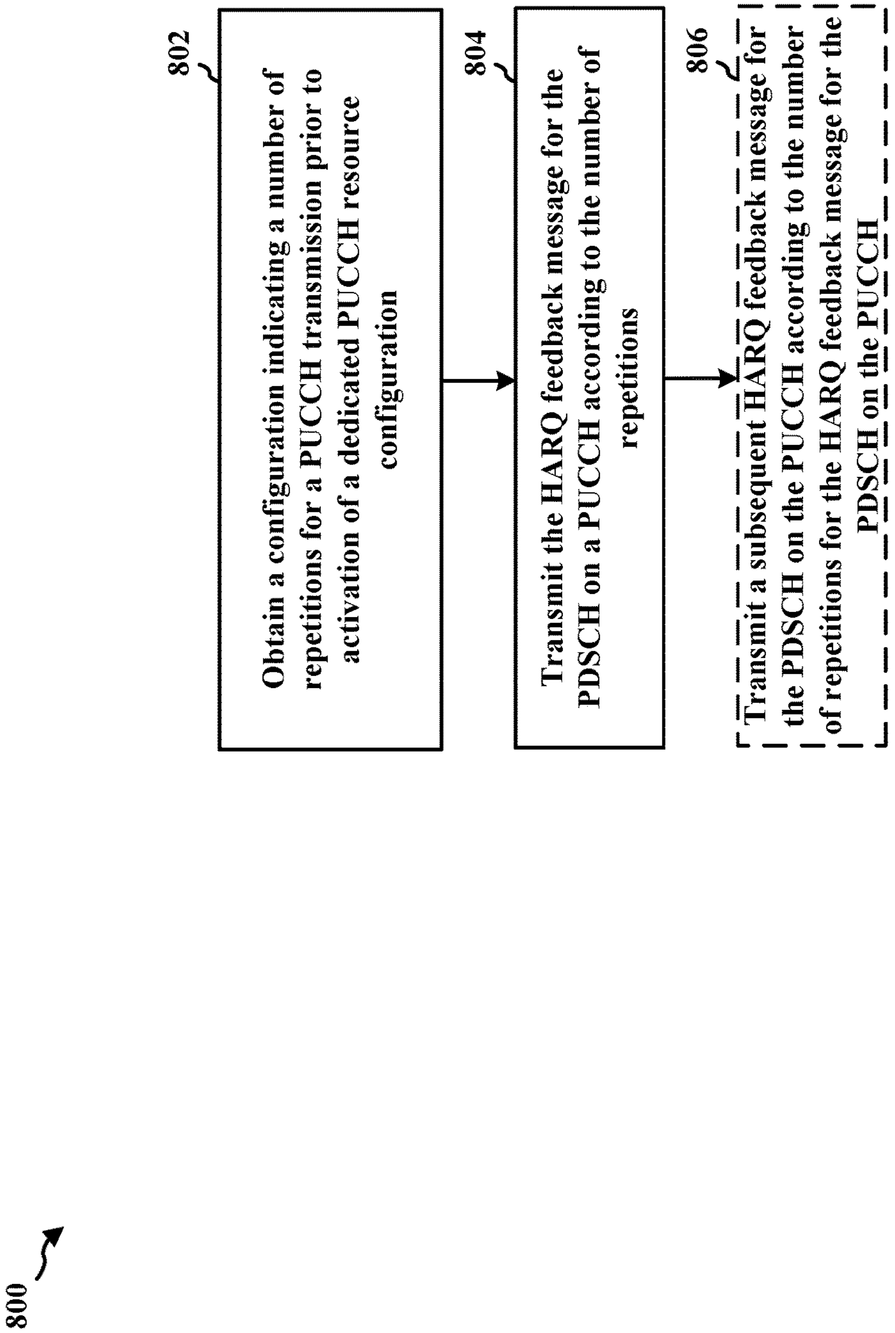
FIGS. 8 through 9 illustrate example flowcharts illustrating methods of wireless communication at a UE.

FIG. 8 is a flowchart of a method 800 of wireless communication at a UE. The method 800 may be performed by or at a UE (e.g., the UE 104, 450, 504), another wireless communications apparatus (e.g., the apparatus 1202), or one or more components thereof. According to various different aspects, one or more of the illustrated methods 800 may be omitted, transposed, and/or contemporaneously performed. Optional aspects are illustrated in dashed lines. This method 800 allows for indicating PUCCH repetition for PDSCH in early contention resolution.

The method 800 may be performed by an apparatus, such as a configuration component 198, as described above. In some implementations, the method 800 is performed by processing logic, including hardware, firmware, software, or a combination thereof. In some implementations, the method 800 is performed by a processor executing code stored in a non-transitory computer-readable medium (e.g., a memory).

At operation 802, the apparatus may be configured to obtain a configuration indicating a number of repetitions for a PUCCH transmission for a PDSCH prior to activation of a dedicated PUCCH resource configuration. The PUCCH transmission may include a HARQ feedback message after receiving a contention resolution message carried in a prior PDSCH in a random access procedure.

In some aspects, the number of repetitions may be indicated in a downlink control information (DCI) format scrambled by TC-RNTI which schedules a first RRC message after the contention message. For example, referring back to 618 from FIG. 6, the apparatus 504 may receive a PDCCH (DCI 1_0 scrambled by C-RNTI schedules Message 2) indicating a number of PUCCH repetitions. In an aspect, the apparatus may be a user equipment. In some aspects, the number of repetitions may be indicated in bits from the DCI format scrambled by TC-RNTI. In some aspects, the number of repetitions may be indicated based on a table describing associations of bits to numbers of repetitions.

In some aspects, the repetition may follow an indication of a number of repetitions of the PUCCH for a prior PDSCH that carries the contention resolution message. For example, referring back to 716 from FIG. 7, the apparatus 504 may transmit a PUCCH for RRC message HARQ-ACK with repetitions by following the indication for PUCCH for Message 4 HARD ACK with repetitions. In some aspects, the number of repetitions is indicated via reserved bits in a DCI format scrambled by TC-RNTI. In some aspects, the number of repetitions is indicated based on a control state information (CSI) request bit in a random access response (RAR) grant.

At operation 804, the apparatus may be configured to transmit the HARQ feedback message for the PDSCH on a PUCCH according to the number of repetitions. The number of repetitions may follow an indication of a number of repetitions of the PUCCH for a prior PDSCH that carries the contention resolution message. For example, referring back to 622 from FIG. 6, the apparatus 504 may transmit a PUCCH with repetitions for the PDSCH. As another example, referring back to 722 from FIG. 7, the apparatus 504 may transmit a PUCCH with repetitions for the PDSCH by following the indication for PUCCH for Message 4 HARQ-ACK.

Optionally, at operation 806, the apparatus may be configured to transmit a subsequent HARQ feedback message for the PDSCH on the PUCCH according to the number of repetitions for the HARQ feedback message for the PDSCH on the PUCCH. In some examples, the PDSCH carries a RRC message and the subsequent HARQ feedback message comprises a RRC feedback message after receiving the RRC message. This allows the same repetition factor is applied for PUCCH for Msg4 HARQ-ACK and subsequent PUCCH transmissions by using a common PUCCH resource. In some examples, it is not precluded for a base station to provide dedicated PUCCH configuration via Msg4 PDSCH.

Figure 9:
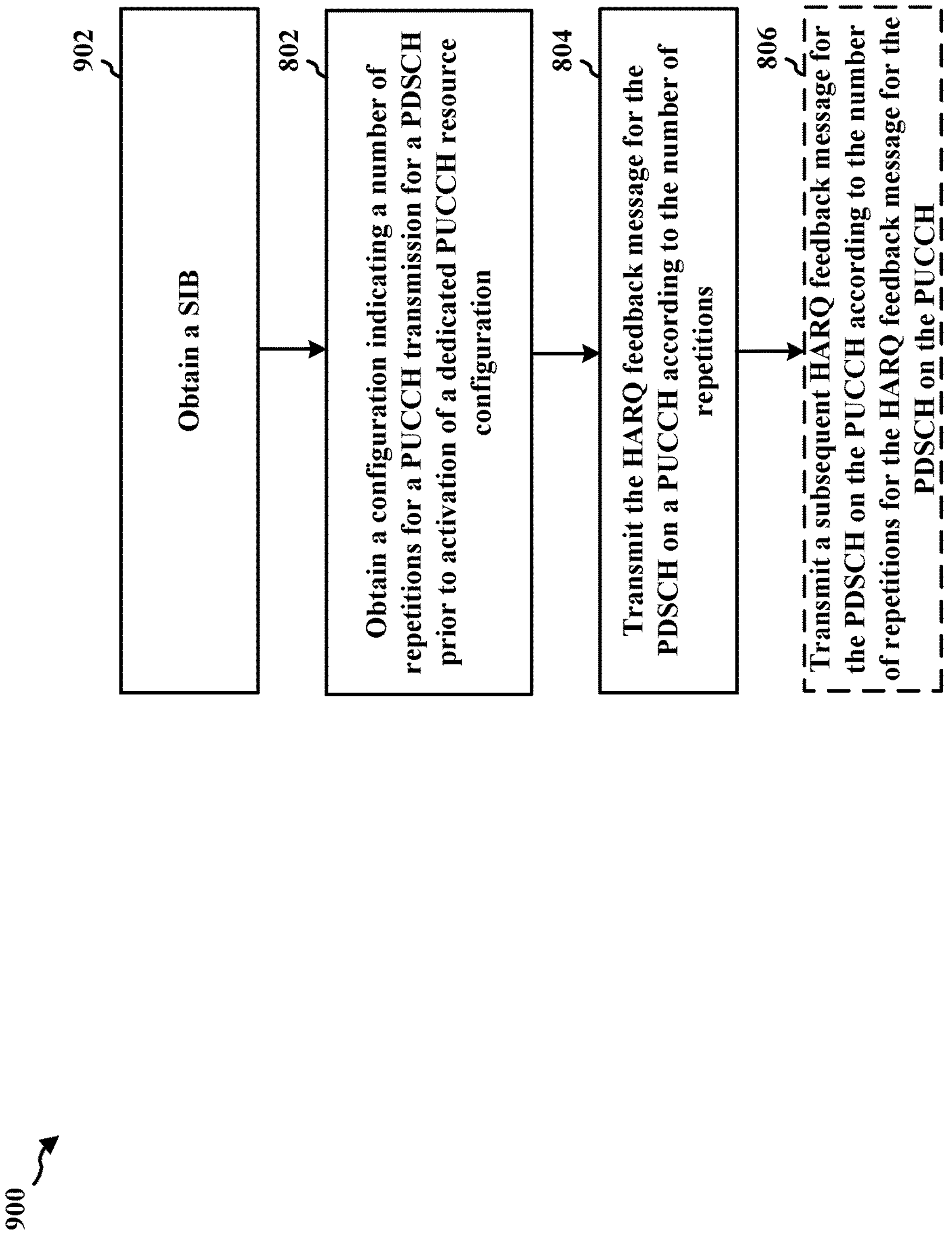

FIG. 9 is a flowchart of a method 900 of wireless communication at a UE. The method 900 may be performed by or at a UE (e.g., the UE 104, 450, 504), another wireless communications apparatus (e.g., the apparatus 1202), or one or more components thereof. According to various different aspects, one or more of the illustrated methods 900 may be omitted, transposed, and/or contemporaneously performed. This method 900 allows for indicating PUCCH repetition for PDSCH in early contention resolution. In the method 900, operations 802 and operation 804 are performed as described above in connection with FIG. 8.

The method 900 may be performed by an apparatus, such as a configuration component 198, as described above. In some implementations, the method 900 is performed by processing logic, including hardware, firmware, software, or a combination thereof. Optional aspects are illustrated in dashed lines. In some implementations, the method 900 is performed by a processor executing code stored in a non-transitory computer-readable medium (e.g., a memory).

At operation 902, the UE may be configured to obtain a SIB. The number of repetitions is indicated on a codepoint signaled in the SIB. For instance, a network may signal the codepoints (e.g., bits 00 corresponds to 1 repetition, bits 01 corresponds to 4 repetitions, bits 10 corresponds to 8 repetitions and bits 11 corresponds to 16 repetitions). This is a flexible way because the bits may be mapped to any number of repetitions. For example, referring back to 620 from FIG. 6, the apparatus 504 may obtain SIB for signaling codepoints.

Figure 10:
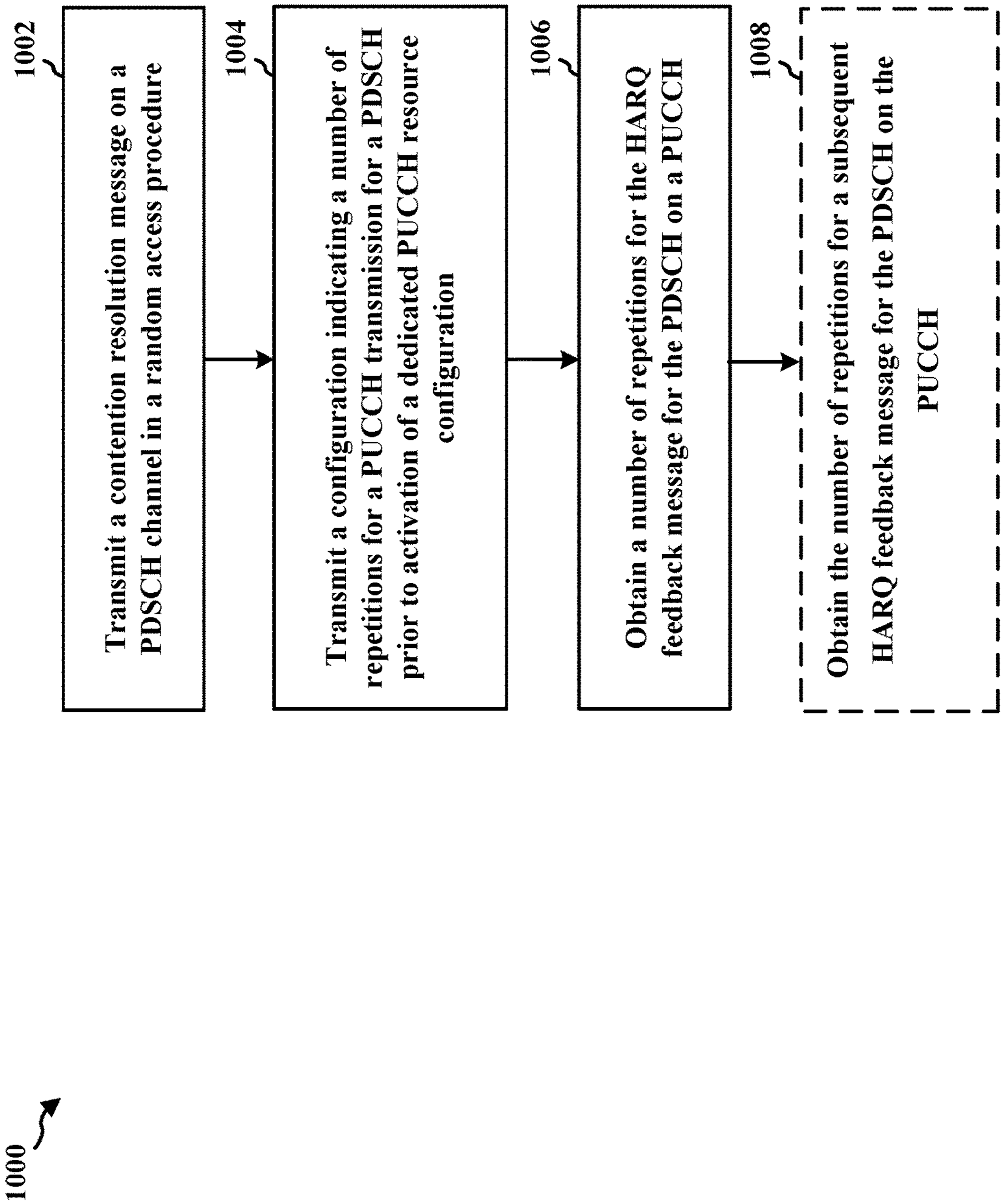
FIGS. 10 through 11 illustrates example flowcharts illustrating methods of wireless communication at a base station.

FIG. 10 is a flowchart of a method 1000 of wireless communication at a base station. The method 1000 may be performed by or at a base station (e.g., the base station 102/108, 410, 502), another wireless communications apparatus (e.g., the apparatus 1302), or one or more components thereof. According to various different aspects, one or more of the illustrated methods 1000 may be omitted, transposed, and/or contemporaneously performed. This method 1000 allows for indicating PUCCH repetition for PDSCH in early contention resolution.

The method 1000 may be performed by an apparatus, such as a configuration component 199, as described above. In some implementations, the method 1000 is performed by processing logic, including hardware, firmware, software, or a combination thereof. Optional aspects are illustrated in dashed lines. In some implementations, the method 1000 is performed by a processor executing code stored in a non-transitory computer-readable medium (e.g., a memory).

At operation 1002, the apparatus may be configured to transmit a contention resolution message on a PDSCH channel in a random access procedure. For example, referring back to 614 from FIG. 6, the apparatus 504 may transmit a Message 4. As another example, referring back to 714 from FIG. 7, the apparatus 504 may transmit a Message 4. In an aspect, the apparatus may be a base station.

At operation 1004, the apparatus may be configured to transmit a configuration indicating a number of repetitions for a PUCCH transmission for a PDSCH prior to activation of a dedicated PUCCH resource configuration. The scheduled PUCCH transmission may include a HARQ feedback message after transmitting a contention resolution message carried in a prior PDSCH in a random access procedure.

In some aspects, the number of repetitions may be indicated in a DCI format scrambled by TC-RNTI which schedules a first RRC message after the contention resolution message. For example, as shown in 612 in FIG. 6, the base station 502 may transmit a PDCCH for DCI 1_0 scrambled by TC-RNTI indicating a PUCCH repetition for Message 4. In some aspects, the number of repetitions may be indicated based on bits from the DCI format scrambled by TC-RNTI. In some aspects, the number of repetitions may be indicated based on a table describing association of bits to numbers of repetitions.

In some aspects, the number of repetitions may follow an indication of a number of repetitions of the PUCCH for a prior PDSCH that carries the contention resolution message. For example, as shown in 722 from FIG. 7, the base station 502 may obtain a PUCCH with repetitions for the PDSCH where the repetitions follows a repetition indication for PUCCH for Message 4 HARQ-ACK. In some aspects, the number of repetitions is indicated via reserved bits in a DCI format scrambled by TC-RNTI. In some aspects, the number of repetitions is indicated based on a CSI request bit in a RAR grant.

At operation 1006, the apparatus may be configured to obtain a number of repetitions for the HARQ feedback message for the PDSCH on a PUCCH according to the number of repetitions.

Optionally, at operation 1008, the apparatus may be configured to obtain the number of repetitions for a subsequent HARQ feedback message for the PDSCH on the PUCCH, wherein the number of repetitions is a same number of repetitions for the HARQ feedback message for the PDSCH on the PUCCH. In some examples, the PDSCH carries a radio resource control (RRC) message and the subsequent HARQ feedback message comprises a RRC feedback message after receiving the RRC message.

Figure 11:
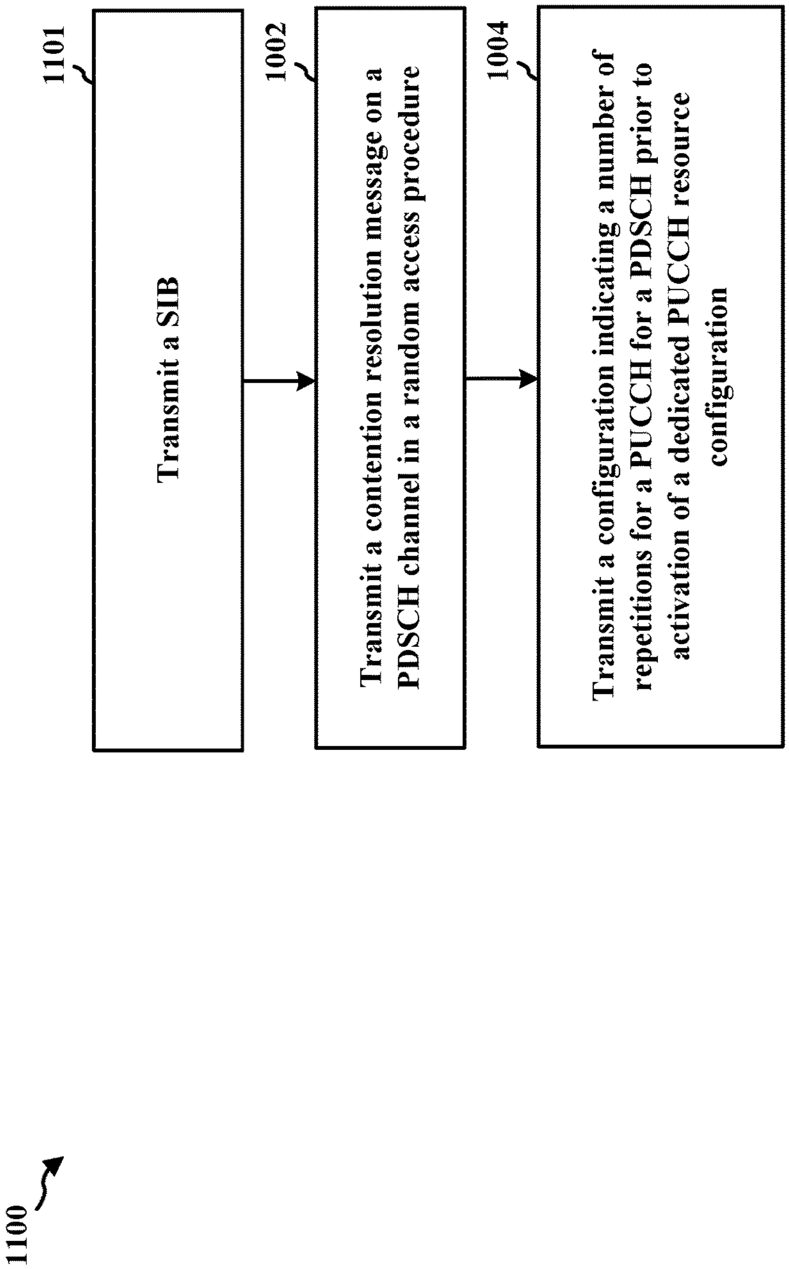

FIG. 11 is a flowchart of a method 1100 of wireless communication at a base station. The method 1100 may be performed by or at a base station (e.g., the base station 102/108, 410, 502), another wireless communications apparatus (e.g., the apparatus 1302), or one or more components thereof. According to various different aspects, one or more of the illustrated methods 1100 may be omitted, transposed, and/or contemporaneously performed. This method 1100 allows for indicating PUCCH repetition for PDSCH in early contention resolution.

The method 1100 may be performed by an apparatus, such as a configuration component 199, as described above. In some implementations, the method 1100 is performed by processing logic, including hardware, firmware, software, or a combination thereof. In some implementations, the method 1100 is performed by a processor executing code stored in a non-transitory computer-readable medium (e.g., a memory). In the method 1100, operations 1002, 1004, and 1006 are performed as described above in connection with FIG. 10.

At operation 1101, the apparatus is configured to transmit a SIB. The number of repetitions is indicated based on a codepoint signaled in the system information. For example, referring back to 602 from FIG. 6, the base station 502 may transmit a SIB for signaling codepoints.

Figure 12:
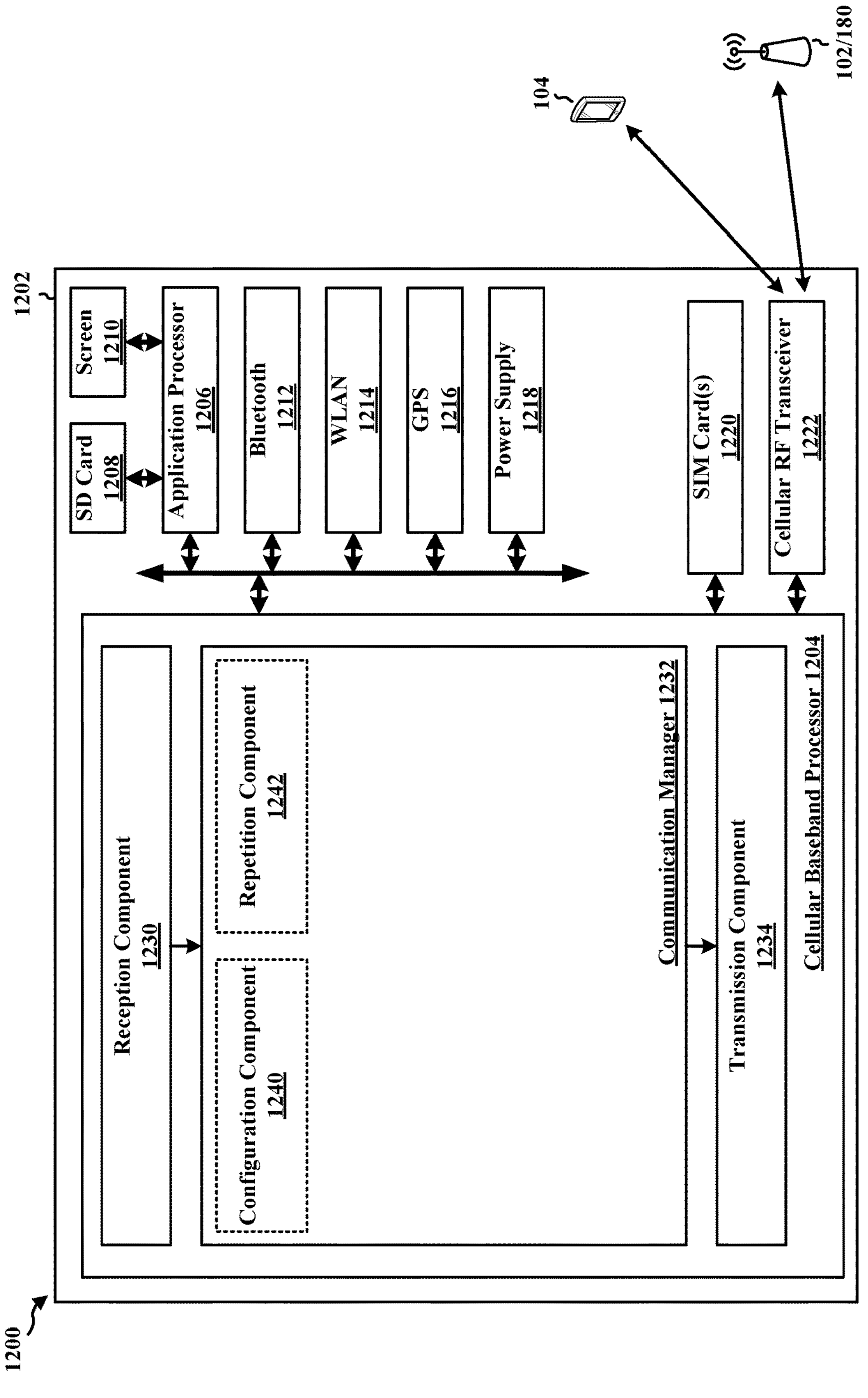
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE or similar device, or the apparatus 1202 may be a component of a UE or similar device. The apparatus 1202 may include a cellular baseband processor 1204 (also referred to as a modem) and/or a cellular RF transceiver 1222, which may be coupled together and/or integrated into the same package, component, circuit, chip, and/or other circuitry.

In an aspect, the apparatus 1202 may accept or may include one or more subscriber identity modules (SIM) cards 1220, which may include one or more integrated circuits, chips, or similar circuitry, and which may be removable or embedded. The one or more SIM cards 1220 may carry identification and/or authentication information, such as an international mobile subscriber identity (IMSI) and/or IMSI-related key(s). Further, the apparatus 1202 may include one or more of an application processor 1206 coupled to a secure digital (SD) card 1208 and a screen 1210, a Bluetooth module 1212, a wireless local area network (WLAN) module 1214, a Global Positioning System (GPS) module 1216, and/or a power supply 1218.

The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204.

In the context of FIG. 4, the cellular baseband processor 1204 may be a component of the UE 450 and may include the memory 460 and/or at least one of the TX processor 468, the RX processor 456, and/or the controller/processor 459. In one configuration, the apparatus 1202 may be a modem chip and/or may be implemented as the cellular baseband processor 1204, while in another configuration, the apparatus 1202 may be the entire UE (e.g., the UE 450 of FIG. 4, the UE 504 in FIGS. 5-8) and may include some or all of the abovementioned components, circuits, chips, and/or other circuitry illustrated in the context of the apparatus 1202. In one configuration, the cellular RF transceiver 1222 may be implemented as at least one of the transmitter 454TX and/or the receiver 454RX.

The reception component 1230 may be configured to receive signaling on a wireless channel, such as signaling from a base station 102/180 or UE 104. The transmission component 1234 may be configured to transmit signaling on a wireless channel, such as signaling to a base station 102/180 or UE 104. The communication manager 1232 may coordinate or manage some or all wireless communications by the apparatus 1202, including across the reception component 1230 and the transmission component 1234.

The reception component 1230 may provide some or all data and/or control information included in received signaling to the communication manager 1232, and the communication manager 1232 may generate and provide some or all of the data and/or control information to be included in transmitted signaling to the transmission component 1234. The communication manager 1232 may include the various illustrated components, including one or more components configured to process received data and/or control information, and/or one or more components configured to generate data and/or control information for transmission.

The communication manager 1232 includes a configuration component 1240 that is configured to obtain a configuration indicating a number of repetitions for a PUCCH transmission for a PDSCH prior to activation of a dedicated PUCCH resource configuration. The PUCCH transmission may include a HARQ feedback message after receiving a contention resolution message carried in a prior PDSCH in a random access procedure.

In an aspect, the communication manager 1232 further includes a repetition component 1242 that is configured to transmit the HARQ feedback message for the PDSCH on a PUCCH according to the number of repetitions. The number of repetitions may follow an indication of a number of repetitions of the PUCCH for a prior PDSCH that carries the contention resolution message. As an example, referring to 622 from FIG. 6, the UE 504 may be configured to transmit PUCCH with repetitions for the PDSCH. As another example, referring to 722 from FIG. 7, the UE 504 may be configured to transmit a PUCCH with repetitions for the PDSCH.

The apparatus 1202 may include additional components that perform some or all of the blocks, operations, signaling, etc. of the algorithm(s) in the aforementioned call flow diagram(s) and/or flowchart(s) of FIGS. 6-10. As such, some or all of the blocks, operations, signaling, etc. in the aforementioned call flow diagram(s) and/or flowchart(s) of FIGS. 6-10 may be performed by one or more components and the apparatus 1202 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, may include means for obtaining a configuration indicating a number of repetitions for a PUCCH transmission for a PDSCH prior to activation of a dedicated PUCCH resource configuration. The PUCCH transmission may include a HARQ feedback message after receiving a contention resolution message carried in a prior PDSCH in a random access procedure. The apparatus 1202, and in particular the cellular baseband processor 1204, may include further includes means for transmitting the HARQ feedback message for the PDSCH on a PUCCH according to the number of repetitions. As an example, referring to 622 from FIG. 6, the UE 504 may be configured to transmit PUCCH with repetitions for the PDSCH. As another example, referring to 722 from FIG. 7, the UE 504 may be configured to transmit a PUCCH with repetitions for the PDSCH.

The aforementioned means may be one or more of the aforementioned components of the apparatus 1202 configured to perform the functions recited by the aforementioned means. As described supra, the apparatus 1202 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 13:
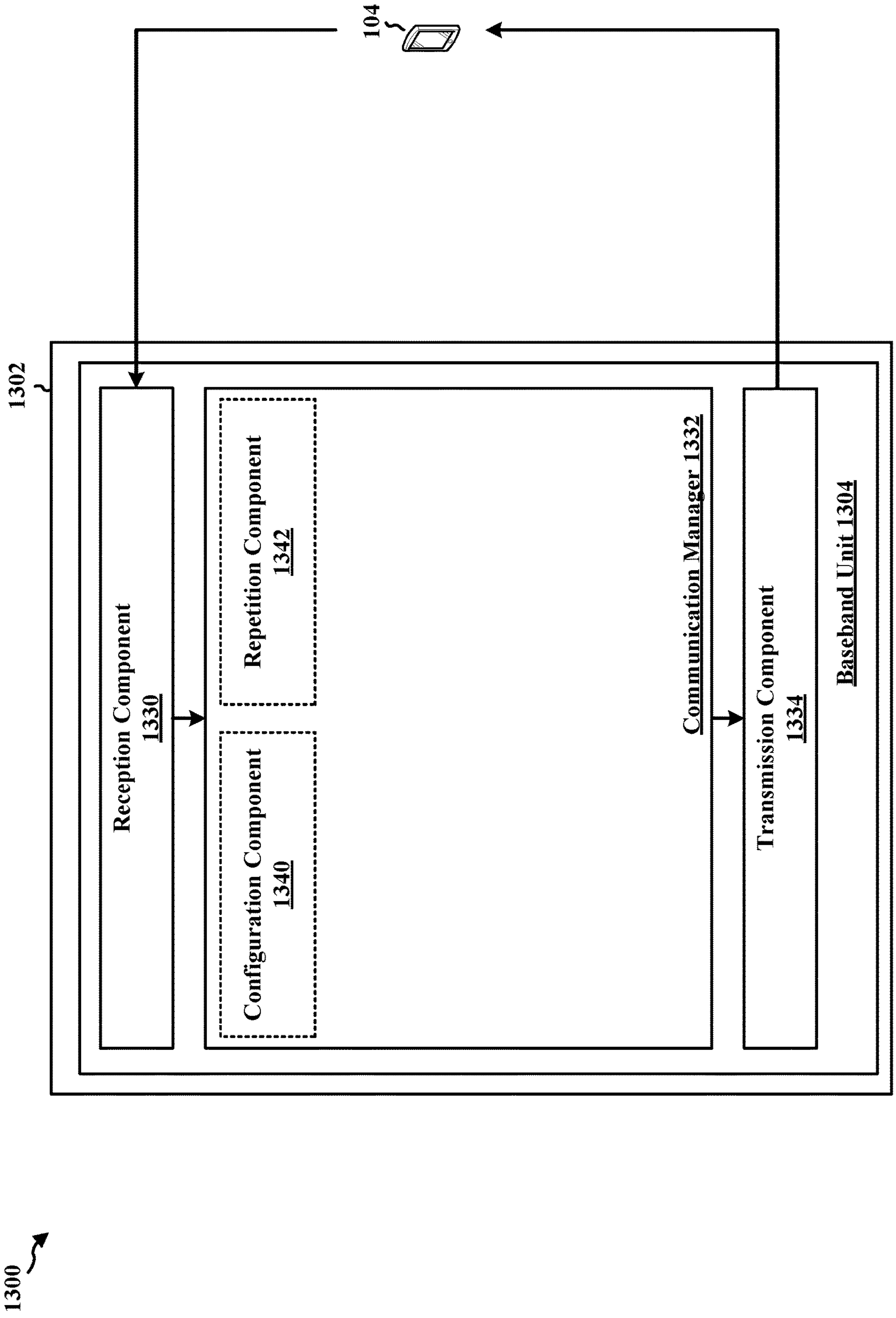
FIG. 13 is a diagram illustrating another example of a hardware implementation for another example apparatus.

FIG. 13 is a diagram 1300 illustrating an example of a hardware implementation for an apparatus 1302. The apparatus 1302 may be a base station or similar device or system, or the apparatus 1302 may be a component of a base station or similar device or system. The apparatus 1302 may include a baseband unit 1304. The baseband unit 1304 may communicate through a cellular RF transceiver. For example, the baseband unit 1304 may communicate through a cellular RF transceiver with a UE 104, such as for downlink and/or uplink communication, and/or with a base station 102/180, such as for IAB.

The baseband unit 1304 may include a computer-readable medium/memory, which may be non-transitory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 410 and may include the memory 476 and/or at least one of the TX processor 416, the RX processor 470, and the controller/processor 475.

The reception component 1330 may be configured to receive signaling on a wireless channel, such as signaling from a UE 104 or base station 102/180. The transmission component 1334 may be configured to transmit signaling on a wireless channel, such as signaling to a UE 104 or base station 102/180. The communication manager 1332 may coordinate or manage some or all wireless communications by the apparatus 1302, including across the reception component 1330 and the transmission component 1334.

The reception component 1330 may provide some or all data and/or control information included in received signaling to the communication manager 1332, and the communication manager 1332 may generate and provide some or all of the data and/or control information to be included in transmitted signaling to the transmission component 1334. The communication manager 1332 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 1332 includes a configuration component 1340 that is configured to transmit a configuration indicating a number of repetitions for a scheduled physical uplink control channel (PUCCH) transmission for a PDSCH prior to activation of a dedicated PUCCH resource configuration, e.g., as described in connection with operation 1004 from FIG. 10. In some aspects, the communication manager 1332 may include a repetition component 1342 that is configured to obtain a number of repetitions for the HARQ feedback message for the PDSCH on a PUCCH, e.g., as described in connection with operation 1006 from FIG. 10. The number of repetitions may follow an indication of a number of repetitions of the PUCCH for a prior PDSCH that carries the contention resolution message.

The apparatus 1302 may include additional components that perform some or all of the blocks, operations, signaling, etc. of the algorithm(s) in the aforementioned call flow diagram(s) and/or flowchart(s) of FIGS. 5-6 and 10-11. As such, some or all of the blocks, operations, signaling, etc. in the aforementioned call flow diagram(s) and/or flowchart(s) of FIGS. 5-6 and 10-11 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, may include means for transmitting a contention resolution message on a PDSCH channel in a random access procedure. The apparatus also includes means for transmitting a configuration indicating a number of repetitions for a scheduled PUCCH transmission for a PDSCH prior to activation of a dedicated PUCCH resource configuration. The scheduled PUCCH transmission may include a HARQ feedback message after transmitting a contention resolution message carried in a prior PDSCH in a random access procedure. The apparatus further includes means for obtaining a number of repetitions for the HARQ feedback message for the PDSCH on a PUCCH.

The aforementioned means may be one or more of the aforementioned components of the apparatus 1302 configured to perform the functions recited by the aforementioned means. As described supra, the apparatus 1302 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

As described in further detail in the present disclosure, PUCCH repetition may be performed to increase coverage extension during random access procedures. In particular, a UE may perform repetition on a second PDSCH (the first PDSCH being Message 4) that carries a RRC message after Message 4 in early contention resolution. The PUCCH transmission may then be transmitted on resources prior to activation of a dedicated PUCCH resource configuration.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

SOME ADDITIONAL EXAMPLES

The aspects described herein additionally include one or more of the following implementation examples described in the following numbered clauses.

Aspect 1. An apparatus for wireless communication, comprising:

a memory; and at least one processor coupled to the memory and configured to:

obtain a configuration indicating a number of repetitions for a physical uplink control channel (PUCCH) transmission for a Physical Downlink Shared Channel (PDSCH) prior to activation of a dedicated PUCCH resource configuration, wherein the PUCCH transmission includes a Hybrid Automatic Repeat Request (HARQ) feedback message after receiving a contention resolution message carried in a prior PDSCH in a random access procedure; and transmit the HARQ feedback message for the PDSCH on a PUCCH according to the number of repetitions.

Aspect 2. The apparatus of aspect 1, wherein the apparatus is user equipment (UE).

Aspect 3. The apparatus of aspects 1 or 2, wherein the number of repetitions is indicated in a downlink control information (DCI) format scrambled by Temporary Cell Radio Network Temporary Identifier (TC-RNTI) which schedules a first RRC message after the contention resolution message.

Aspect 4. The apparatus of any of the aspects 1 to 3, wherein the number of repetitions is indicated in bits from the DCI format scrambled by TC-RNTI.

Aspect 5. The apparatus of any of the aspects 1 to 4, wherein the number of repetitions is indicated based on a table describing associations of bits to numbers of repetitions.

Aspect 6. The apparatus of any of the aspects to 1 to 5, wherein the at least one processor is further configured to: obtain a system information block (SIB), wherein the number of repetitions is indicated based on a codepoint signaled in the SIB.

Aspect 7. The apparatus of any of the aspects 1 to 6, wherein the number of repetitions follows an indication of a number of repetitions of the PUCCH for a prior PDSCH that carries the contention resolution message.

Aspect 8. The apparatus of any of the aspects 1 to 7, wherein the number of repetitions is indicated via reserved bits in a downlink control information (DCI) format scrambled by TC-RNTI.

Aspect 9. The apparatus of any of the aspects 1 to 8, wherein the number of repetitions is indicated based on a control state information (CSI) request bit in a random access response (RAR) grant.

Aspect 10. An apparatus for wireless communication, comprising:

a memory; and at least one processor coupled to the memory and configured to:

transmit a contention resolution message on a Physical Downlink Shared Channel (PDSCH) channel in a random access procedure;

transmit a configuration indicating a number of repetitions for a physical uplink control channel (PUCCH) transmission for a Physical Downlink Shared Channel (PDSCH) prior to activation of a dedicated PUCCH resource configuration, wherein the PUCCH transmission includes a Hybrid Automatic Repeat Request (HARQ) feedback message after receiving a contention resolution message carried in a prior PDSCH in a random access procedure; and obtain a number of repetitions for the HARQ feedback message for the PDSCH on a PUCCH.

Aspect 11. The apparatus of aspect 10, wherein the apparatus is a base station.

Aspect 12. The apparatus of aspect 10 or 11, wherein the number of repetitions is indicated in a downlink control information (DCI) format scrambled by Temporary Cell Radio Network Temporary Identifier (TC-RNTI) which schedules a first RRC message after the contention resolution message.

Aspect 13. The apparatus of aspects 10 to 12, wherein the number of repetitions is indicated in bits from the DCI format scrambled by TC-RNTI.

Aspect 14. The apparatus of aspects 10 to 13, wherein the number of repetitions is indicated based on a table describing associations of bits to numbers of repetitions.

Aspect 15. The apparatus of aspects 10 to 14, wherein the at least one processor is further configured to: transmit a system information block (SIB), wherein the number of repetitions is indicated based on a codepoint signaled in the SIB.

Aspect 16. The apparatus of aspects 10 to 15, wherein the number of repetitions follows an indication of a number of repetitions of the PUCCH for a prior PDSCH that carries the contention resolution message.

Aspect 17. The apparatus of aspects 10 to 16, wherein the number of repetitions is indicated via reserved bits in a downlink control information (DCI) format scrambled by TC-RNTI.

Aspect 18. The apparatus of aspects 10 to 17, wherein the number of repetitions is indicated based on a control state information (CSI) request bit in a random access response (RAR) grant.

Aspect 19. A method of wireless communication at a user equipment (UE), comprising:

obtaining a configuration indicating a number of repetitions for a physical uplink control channel (PUCCH) transmission for a Physical Downlink Shared Channel (PDSCH) prior to activation of a dedicated PUCCH resource configuration, wherein the PUCCH transmission includes a Hybrid Automatic Repeat Request (HARQ) feedback message after receiving a contention resolution message carried in a prior PDSCH in a random access procedure; and transmitting the HARQ feedback message for the PDSCH on a PUCCH according to the number of repetitions.

Aspect 20. The method of aspect 19, wherein the number of repetitions is indicated in a downlink control information (DCI) format scrambled by Temporary Cell Radio Network Temporary Identifier (TC-RNTI) which schedules a first RRC message after the contention resolution message.

Aspect 21. The method of aspects 19 or 20, wherein the number of repetitions is indicated in bits from the DCI format scrambled by TC-RNTI.

Aspect 22. The method of aspects 19 to 21, wherein the number of repetitions is indicated based on a table describing associations of bits to numbers of repetitions.

Aspect 23. The method of aspects 19 to 22, further comprising: obtaining a system information block (SIB), wherein number of repetitions is indicated based on a codepoint signaled in the SIB.

Aspect 24. The method of aspects 19 to 23, wherein the number of repetitions follows an indication of a number of repetitions of the PUCCH for a prior PDSCH that carries the contention resolution message.

Aspect 25. The method of aspects 19 to 24, wherein the number of repetitions is indicated via reserved bits in a downlink control information (DCI) format scrambled by TC-RNTI.

Aspect 26. The method of aspects 19 to 25, wherein the number of repetitions is indicated based on a control state information (CSI) request bit in a random access response (RAR) grant.

Aspect 27. A computer-readable medium storing computer-executable code for wireless communication at a user equipment (UE), the code when executed by a processor cause the processor to:

obtain a configuration indicating a number of repetitions for a physical uplink control channel (PUCCH) transmission for a Physical Downlink Shared Channel (PDSCH) prior to activation of a dedicated PUCCH resource configuration, wherein the PUCCH transmission includes a Hybrid Automatic Repeat Request (HARQ) feedback message after receiving a contention resolution message carried in a prior PDSCH in a random access procedure; and transmit the HARQ feedback message for the PDSCH on a PUCCH according to the number of repetitions.

Aspect 28. The computer-readable medium of aspect 27, wherein the number of repetitions is indicated in a downlink control information (DCI) format scrambled by Temporary Cell Radio Network Temporary Identifier (TC-RNTI) which schedules a first RRC message after the contention resolution message.

Aspect 29. The computer-readable medium of aspects 27 or 28, wherein the number of repetitions is indicated in bits from the DCI format scrambled by TC-RNTI.

Aspect 30. The computer-readable medium of aspects 27 to 29, wherein the number of repetitions is indicated based on a table describing associations of bits to numbers of repetitions.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the aspects disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the aspects described in this disclosure may be readily apparent to persons having ordinary skill in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, various features that are described in this specification in the context of separate aspects also can be implemented in combination in a single aspect. Conversely, various features that are described in the context of a single aspect also can be implemented in multiple aspects separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

What is claimed is:

1. An apparatus for wireless communication, comprising:

a memory; and at least one processor coupled to the memory and configured to:

obtain a configuration indicating a number of repetitions for a physical uplink control channel (PUCCH) transmission for a Physical Downlink Shared Channel (PDSCH) prior to activation of a dedicated PUCCH resource configuration, wherein the PUCCH transmission includes a Hybrid Automatic Repeat Request (HARQ) feedback message after receiving a contention resolution message carried in a prior PDSCH in a random access procedure, and transmit the HARQ feedback message for the PDSCH on a PUCCH according to the number of repetitions, wherein the number of repetitions is indicated in a downlink control information (DCI) format scrambled by Temporary Cell Radio Network Temporary Identifier (TC-RNTI) which schedules a first RRC message after the contention resolution message.

2. The apparatus of claim 1, wherein the at least one processor coupled to the memory and further configured to:

transmit a subsequent HARQ feedback message for the PDSCH on the PUCCH according to the number of repetitions for the HARQ feedback message for the PDSCH on the PUCCH.

3. The apparatus of claim 2, wherein the PDSCH carries a radio resource control (RRC) message and the subsequent HARQ feedback message comprises a RRC feedback message after receiving the RRC message.

4. The apparatus of claim 1, wherein the number of repetitions is indicated via reserved bits in a downlink control information (DCI) format scrambled by TC-RNTI.

5. The apparatus of claim 1, wherein the number of repetitions is indicated based on a control state information (CSI) request bit in a random access response (RAR) grant.

6. The apparatus of claim 1, wherein the number of repetitions follows an indication of a number of repetitions of the PUCCH for a prior PDSCH that carries the contention resolution message.

7. The apparatus of claim 6, wherein the at least one processor is further configured to:

obtain a system information block (SIB), wherein the number of repetitions is indicated based on a codepoint signaled in the SIB.

8. The apparatus of claim 1, wherein the number of repetitions is indicated in bits from the DCI format scrambled by TC-RNTI or based on a table describing associations of bits to numbers of repetitions.

9. An apparatus for wireless communication, comprising:

a memory; and at least one processor coupled to the memory and configured to:

transmit a contention resolution message on a Physical Downlink Shared Channel (PDSCH) channel in a random access procedure;

transmit a configuration indicating a number of repetitions for a physical uplink control channel (PUCCH) transmission for a Physical Downlink Shared Channel (PDSCH) prior to activation of a dedicated PUCCH resource configuration, wherein the PUCCH transmission includes a Hybrid Automatic Repeat Request (HARQ) feedback message after receiving a contention resolution message carried in a prior PDSCH in a random access procedure; and obtain a number of repetitions for the HARQ feedback message for the PDSCH on a PUCCH, wherein the number of repetitions is indicated in a downlink control information (DCI) format scrambled by Temporary Cell Radio Network Temporary Identifier (TC-RNTI) which schedules a first RRC message after the contention resolution message.

10. The apparatus of claim 9, wherein the at least one processor coupled to the memory and further configured to:

obtain the number of repetitions for a subsequent HARQ feedback message for the PDSCH on the PUCCH, wherein the number of repetitions is a same number of repetitions for the HARQ feedback message for the PDSCH on the PUCCH.

11. The apparatus of claim 10, wherein the PDSCH carries a radio resource control (RRC) message and the subsequent HARQ feedback message comprises a RRC feedback message after receiving the RRC message.

12. The apparatus of claim 9, wherein the number of repetitions is indicated via reserved bits in a downlink control information (DCI) format scrambled by TC-RNTI.

13. The apparatus of claim 9, wherein the number of repetitions is indicated based on a control state information (CSI) request bit in a random access response (RAR) grant.

14. The apparatus of claim 9, wherein the number of repetitions is indicated in bits from the DCI format scrambled by TC-RNTI.

15. The apparatus of claim 9, wherein the number of repetitions is indicated based on a table describing associations of bits to numbers of repetitions.

16. The apparatus of claim 9, wherein the at least one processor is further configured to:

transmit a system information block (SIB), wherein the number of repetitions is indicated based on a codepoint signaled in the SIB.

17. A method of wireless communication at a user equipment (UE), comprising:

obtaining a configuration indicating a number of repetitions for a physical uplink control channel (PUCCH) transmission for a Physical Downlink Shared Channel (PDSCH) prior to activation of a dedicated PUCCH resource configuration, wherein the PUCCH transmission includes a Hybrid Automatic Repeat Request (HARQ) feedback message after receiving a contention resolution message carried in a prior PDSCH in a random access procedure; and transmitting the HARQ feedback message for the PDSCH on a PUCCH according to the number of repetitions, wherein the number of repetitions is indicated in a downlink control information (DCI) format scrambled by Temporary Cell Radio Network Temporary Identifier (TC-RNTI) which schedules a first RRC message after the contention resolution message.

18. The method of claim 17, further comprising:

transmitting a subsequent HARQ feedback message for the PDSCH on the PUCCH according to the number of repetitions for the HARQ feedback message for the PDSCH on the PUCCH.

19. The method of claim 18, wherein the PDSCH carries a radio resource control (RRC) message and the subsequent HARQ feedback message comprises a RRC feedback message after receiving the RRC message.

20. The method of claim 17, wherein the number of repetitions is indicated via reserved bits in a downlink control information (DCI) format scrambled by TC-RNTI.

21. The method of claim 17, wherein the number of repetitions is indicated based on a control state information (CSI) request bit in a random access response (RAR) grant.

22. The method of claim 17, wherein the number of repetitions is indicated in bits from the DCI format scrambled by TC-RNTI.

23. The method of claim 17, wherein the number of repetitions is indicated based on a table describing associations of bits to numbers of repetitions.

24. A non-transitory computer-readable medium storing computer-executable code for wireless communication at a user equipment (UE), the code when executed by a processor cause the processor to:

obtain a configuration indicating a number of repetitions for a physical uplink control channel (PUCCH) transmission for a Physical Downlink Shared Channel (PDSCH) prior to activation of a dedicated PUCCH resource configuration, wherein the PUCCH transmission includes a Hybrid Automatic Repeat Request (HARQ) feedback message after receiving a contention resolution message carried in a prior PDSCH in a random access procedure; and transmit the HARQ feedback message for the PDSCH on a PUCCH according to the number of repetitions, wherein the number of repetitions is indicated in a downlink control information (DCI) format scrambled by Temporary Cell Radio Network Temporary Identifier (TC-RNTI) which schedules a first RRC message after the contention resolution message.

25. The non-transitory computer-readable medium of claim 24, wherein the code when executed by the processor further causes the processor to:

transmit a subsequent HARQ feedback message for the PDSCH on the PUCCH according to the number of repetitions for the HARQ feedback message for the PDSCH on the PUCCH.

26. The non-transitory computer-readable medium of claim 24, wherein the number of repetitions is indicated via reserved bits in a downlink control information (DCI) format scrambled by TC-RNTI.

27. The non-transitory computer-readable medium of claim 26, wherein the number of repetitions is indicated based on a control state information (CSI) request bit in a random access response (RAR) grant.

* * * * *